Jan. 12, 1971     V. S. BOBKOWSKI     3,553,897
BATCH PROCESSING APPARATUS

Filed Jan. 25, 1968     2 Sheets-Sheet 1

INVENTOR.
VINCENT S. BOBKOWSKI
BY
ATTORNEY

Jan. 12, 1971 V. S. BOBKOWSKI 3,553,897

BATCH PROCESSING APPARATUS

Filed Jan. 25, 1968 2 Sheets-Sheet 2

INVENTOR.
VINCENT S. BOBKOWSKI
BY
*Harvey C. Vicars*
ATTORNEY

United States Patent Office 3,553,897
Patented Jan. 12, 1971

3,553,897
BATCH PROCESSING APPARATUS
Vincent S. Bobkowski, 4719 Bellflower Blvd.,
Long Beach, Calif. 90808
Filed Jan. 25, 1968, Ser. No. 700,404
Int. Cl. B24c 3/26; B24b 3/02
U.S. Cl. 51—13            8 Claims

ABSTRACT OF THE DISCLOSURE

A drum rotatable about an axis through its ends has openings in its side wall which define a passageway. An inner container fits within this passageway such that its end walls are flush with the side walls of the drum. The inner container opens to the interior of the drum so that parts to be processed are spilled out when the assembly is rotated. The interior of the drum is formed so all of these parts spill back into the inner container when it is rotated to the lower position of the drum. A blast of processing material is admitted in the region of the axis of rotation of the drum and the end walls of the drum are perforated so that the processing material may be expelled from the drum. A housing enclosing the end walls of the drum collects the processing material which is then recirculated back through the drum. The drum is coupled with a control system which insures that the drum stops with the inner container positioned horizontally below the axis of rotation.

---

This invention relates to a batch processing machine and it relates particularly to apparatus for efficient handling and transfer of work pieces to be subjected to batch processing.

It is an object of the invention to provide an improved processing machine in which parts to be processed are treated in batches with minimum handling and particularly with minimum transfer from one container to another. Another object is to provide processing apparatus in which the container by which material to be processed is brought to the apparatus and removed therefrom is incorporated in and becomes a part of the processing apparatus during the processing of its parts.

The invention is applicable to honing, peening, cleaning, degreasing and other treatment of work pieces to be treated and it is an object to provide an improved machine for conducting such treatment.

While not limited thereto, the invention is particularly useful in the provision of machinery for blasting tumbling work pieces with particulate abrasive material. Accordingly, an object of the invention is to provide an improved "dry blasting" or honing machine in which tumbling parts are blasted without need to remove them from the containers in which they are delivered to the machine and in which the containers in which the parts are delivered to the blasting machine become part of the tumbling apparatus.

Another object of the invention is to provide a relatively inexpensive, reliable dry blasting machine which will blast batches of work pieces successively and automatically without need for manually transferring parts from one container to another whereby to minimize labor costs incident to operation of the machine.

Another object is to utilize the containers which serve as tote trays for the parts to be processed as an integral part of the tumbling barrel by which the parts are tumbled during processing whereby to minimize conveyor line complexity to eliminate the need for intermediate load transfer stations, to minimize the timing and interlocking problems associated with conveyor operation for batch processing, to minimize tote tray requirements to facilitate the communication of work instructions with the parts to be processed, to permit conduct of the process in an entirely closed space whereby to confine abrasive material to selected spaces more effectively.

Related objects are to provide an improved tumbling apparatus for parts to be treated with particulate abrasive material and to provide a system in which minimum abrasive material is removed with each batch of treated parts.

These and other objects and advantages of the invention are realized in part by the provision of a rotatable or oscillatable first container comprising a detachable portion itself defining a smaller second container open to the interior of said rotatable container; and means for rotating or oscillating that first container such that work material to be processed and which is contained in said second container is spilled into the interior of the first container; and means for passing processing material through the rotatable first container such that work material spilled into said first container is contacted thereby; and by the provision of means for returning work material to the second container upon succession of rotation or oscillation of the first container.

The preferred embodiment has been selected for illustration in the drawings, in which.

Figure 1:
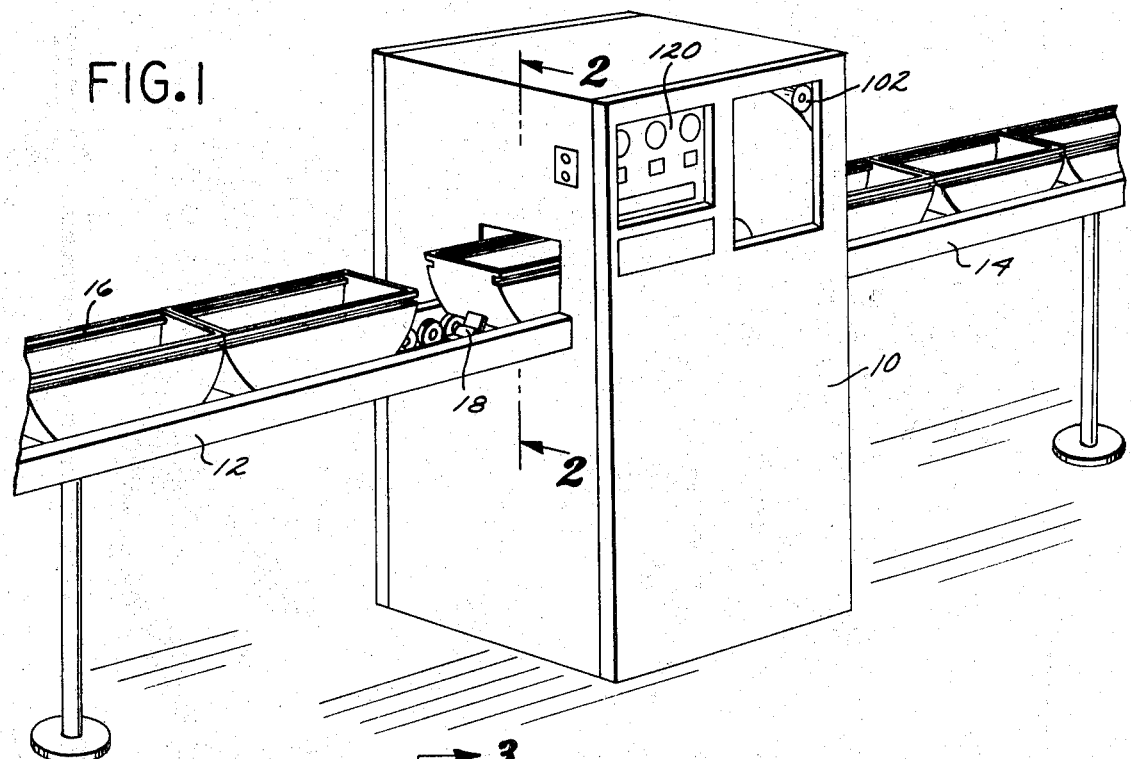
FIG. 1 is an isometric view of apparatus embodying the invention and which includes an automatic line showing a processing machine, a conveyor for delivering parts to be processed to the machine and for carrying them from the machine, and tote containers for work pieces which enter the machine in succession and become a part of it.

Referring to FIG. 1 of the drawing, there is shown a portion of a processing line including a processing machine 10 installed in a conveyor line. The line includes a section 12 by which parts to be processed are delivered to machine 10 and a section 14 by which processed parts are removed therefrom. The parts are carried in tote containers or trays one of which is identified by the numeral 16 in FIG. 1 and all of which are advantageously substantially identical. The delivery section 12 and removal section 14 of the conveyor are aligned on opposite sides of the processing machine 10 and the tote boxes or trays carried by the conveyor are moved through the machine. The tote trays are inserted in the machine one at a time in succession by a reciprocating transfer mechanism generally designated 18 in FIG. 1. As each tote tray is inserted in the machine, the preceding tote tray is expelled from the machine onto the conveyor section 14. Each tote tray is inserted into the processing machine in turn and when installed in the machine each becomes an integral part of the machine. After processing, the parts to be processed are returned to the tote tray and are expelled by entry of the succeeding tote tray.

The machine 10 includes a means for tumbling the work pieces to be processed and for causing the stream of processing material to move through and to contact the work material. Advantageously, as shown, this means includes a rotatable drum structure arranged so that parts contained in the drum are tumbled as the drum rotates. The processing material is introduced into the drum substantially along its axis of rotation and in the direction normal of that axis whereby the work pieces are contacted while spilling and cascading over one another. Examples of processing material are particulate matter including sand, or other abrasive material for abrading the work pieces, and glass beads for peening the work pieces. The apparatus selected for illustration in the drawing is suitable for use with dry particulate processing material but in its broader aspect the invention itself is applicable as well to processing work pieces with liquids, suspensions, and combinations in varying degree of liquid and particulate matter. Means are provided by which the processing material may be expelled from the tumbling drum. Advantageously, this means comprises construction of the drum to have foraminated or screened end walls.

Figure 3:
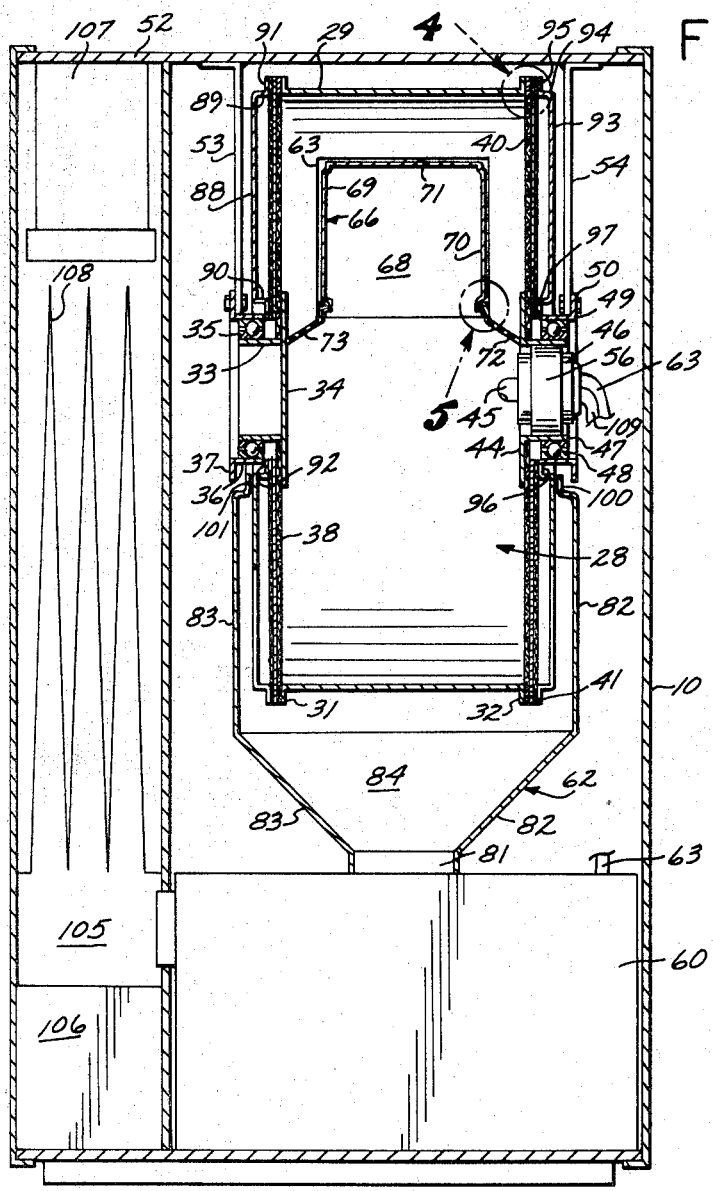
FIG. 3 is a cross-sectional view of the processing machine, taken on line 3—3 of FIG. 2.
Figure 4:
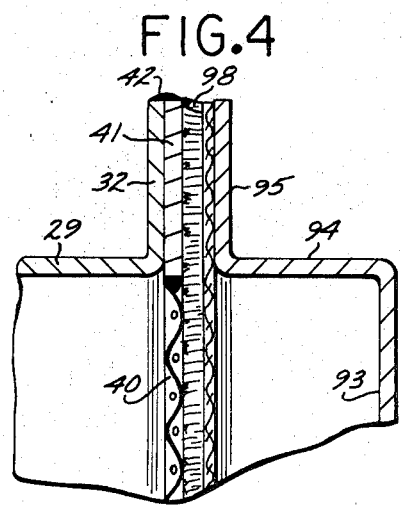
FIG. 4 is an enlarged cross-sectional view of a dust seal incorporated in the machine of FIG. 3 at the point indicated by the numeral "4"

The drum is generally designated 28 in the drawing. The body of the drum is formed of metallic sheet material bent into circular shape to form a cylindrical side wall 29. At each end of the cylinder the side wall 29 is bent laterally to form a flange extending outwardly from the cylinder in a plane perpendicular to the central, rotational axis of the drum. The flange at the left end of the drum (see FIG. 3) is designated 31 and the flange at the right end of the drum in FIG. 3 is designated 32. The two end walls of the drum 28 are formed of screening material except at their central sections where they are provided with a hub structure. The hub structure at the left end wall in FIG. 3 comprises a short hollow cylinder 33 having its inner end closed by a disk 34 of larger diameter. The disk 34 is connected to the cylinder 33 by any suitable means, as by welding, so that its center coincides with the axis of the cylinder 33. The cylinder is fitted within the inner race of a ball bearing 35 whose outer race is fitted within a cylinder 36 which is concentric with the cylinder 33 and which is provided with an outwardly extending flange 37 lying parallel to the cover disk 34. A disk 38 of screening material is cut away at its center to accommodate the disk 33 of the hub structure and is of diameter to extend to the outer limits of the flange 31. Any suitable means may be provided for securing the outer margins of the screen 38 to the flange 31 of the side wall 29 and for securing the inner margins of the end screen 38 to the outer margins of the cover disk 34. Thus, the outer margins of the screen 38 may be clamped between flange 31 and an overlying ring of flat material which is secured as by welding to the flange 31. This construction is shown in FIG. 4, except that FIG. 4 depicts the construction at the other end of the tumbling barrel where the screened end wall 40 is clamped to flange 32 of the side wall 29 by a circular clamping ring 41. This clamping ring is fixed to the flange 32 by a weld bead 42 which extends around the periphery of the flange 32 and ring 41. In similar fashion a ring which encircles the hub cylinder clamps the inner margins of the screened end walls of the barrel to the side of the cover disk of the hub structure. The construction may, as shown, be the same at both the left and right hand hub structures.

The central portion of the cover disk 44 of the right hand hub structure has its central portion cut away to accommodate the nozzle 45 of a blasting gun 46 which fits and is seated within the inner cylinder 47. The cylinder 47 is mounted by an encompassing ball bearing 48 within an encircling, concentric cylinder 49 which is formed with an outwardly extending flange 50 at its outer end. The left and right hub structures are the same except that the cover disk 44 of the right hand structure is cut away to accommodate the blast gun whereas the cover disk 34 of the left hand structure is not cut away so that particulate material projected into the interior of the drum by the blast nozzle 45 will, if it traverses the length of the drum, strike the cover plate 34 to be retained within the drum. If preferred, a second blast gun may be employed and mounted in the left hand hub structure.

The drum and its hub structure are rotatable within the bearings 35 and 48. The bearings are mounted in the cylindrical members 36 and 49 and these members are suspended by their flanges 37 and 50 from the upper wall 52 of the machine cabinet by braces 53 and 54, respectively, whose lower ends are bolted to flanges 37 and 50 and whose upper ends are secured as by welding to the upper wall 52.

Advantageously, the blast gun 46 is not rotatable with the drum. In the embodiment shown in the drawing, a ball bearing 56 encompasses the gun 46 and is disposed between the gun and the hub cylinder 47 so that the drum may rotate without rotation of the gun.

The processing material, such for example as an abrasive used to practice a honing process, is stored in a storage bin, not shown, within the cabinet 60 at the bottom of the enclosure of the machine 10. While the process is being conducted, this process material is removed from the cabinet 60 by a feedhose 63 and is delivered to the blast gun 46 to be expelled from nozzle 45 into the interior of the drum 28 substantially at and normal to the direction of its axis of rotation.

In addition to the parts already described, the drum comprises a removable tote tray. Two openings are formed in the side wall 29 of the drum at points on opposite sides of the drum. The two openings have the same size and shape and they define a passageway extending through the drum in a direction parallel to the end walls of the drum and preferably lying primarily to one side of the axis through the drum. The preferred form is illustrated in the drawing. In FIG. 3, the drum 28 is shown rotated to a position in which the passageway defined by the openings in wall 29 is perpendicular to the page. The drawing having been sectioned, only one opening is visible. Its vertical projection is rectangular and is defined by the line designated by the numeral 63. The cutout which this line defines is equidistant from the end walls 38 and 40 of the drum and in this preferred embodiment it lies entirely on one side of the central rotational axis of the drum. The inner container or tote tray 66 is disposed in the passageway defined by the two openings in the wall 29. The end walls of the tote tray 66 are curved to conform to the curvature of the side wall 29 of the drum and to have an area and dimensions only slightly smaller than the openings in wall 29. Moreover, the end walls of the container 66 are spaced apart at a distance so that when the container 66 is disposed in the passageway formed by the two side wall openings, its ends are flush with the side wall 29.

Figure 6:
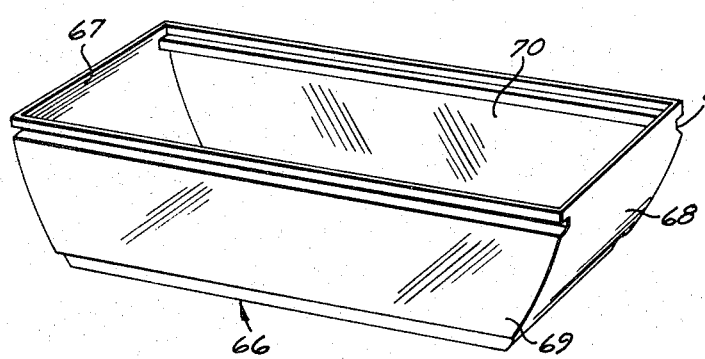
FIG. 6 is an isometric drawing of an inner work parts container.

The tote tray 66 is best shown in FIG. 6. Its end walls are designated 67 and 68, respectively. They are interconnected by parallel side walls 69 and 70. The bottom wall, which is not visible in FIG. 6, is visible in FIGS. 2 and 3 where it is designated by the numeral 71. The upper end of the tote tray 66 is open as shown in FIG. 6.

Figure 2:
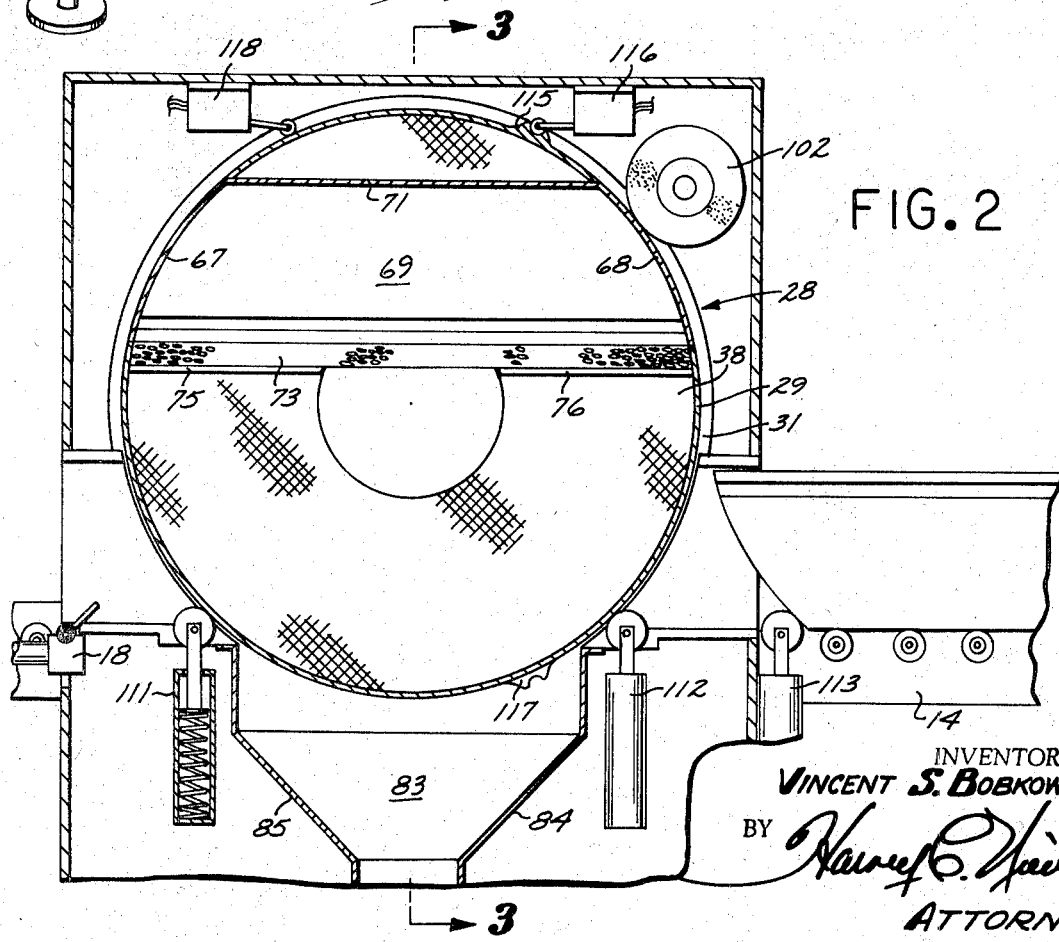
FIG. 2 is a cross-sectional view of a portion of the processing machine of FIG. 1, taken on line 2—2 of FIG. 1.
Figure 5:
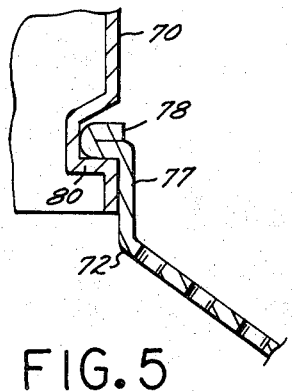
FIG. 5 is a cross-sectional view of a portion of an inner parts container or tote tray employed in the invention associated with the portion of the inner wall structure of the outer container or drum which is employed in the invention as shown in FIG. 3 at the point marked "5" in FIG. 3.

Means are provided in the invention for guiding the tote trays as they are moved into position within the drum and as they are removed from the drum. Means are also provided in the invention for insuring that work pieces are returned to the tote tray upon completion of processing. Advantageously, as shown, these means are combined in a pair of part deflector panels which extend across the interior of the drum one on each end of the drum, and spanning the space between the end walls of the drum and the edges of the side walls 69 and 70 of the tote box adjacent its open side. The right panel in FIG. 3 is designated by the number 72 and the left panel is designated by the numeral 73. This left panel is visible in FIG. 2. The body portion of both panels is foraminated or is made of screening so that process material may pass through it freely but so that the parts to be processed cannot. Advantageously, both are foraminated as shown. At its outer edge the panel 73, shown in FIG. 2, is bent parallel with the end wall 38 of the tumbling barrel. The central section of this edge is cut away to accommodate the end plate or disk 34 so that it is divided into two edge sections. One section 75 lies to the left in FIG. 3 of the hub structure and is secured as by welding to the hub and to the side wall 29 of the drum. The other section 76 lies to the right of the hub structure and is secured in position as by being welded to the hub structure at one end and to the barrel wall 29 at the other. Neither of the edge sections 75 or 76 is visible in FIG. 3 but the body portion of the panel is visible and it extends inwardly and toward the interior of the barrel at an angle away from the center line through the barrel. At its inner end the deflector panel terminates in a lip which is bent to form a guide rail by which tote trays are slid into and out of the barrel. This feature is best shown in FIG. 5 which, in cross-sectional view, shows the inner edge of the deflector panel 72. A portion 77 of the inner edge is bent parallel with the end walls of the drum and the very end of the lip at the inner edge of the panel is bent over double as at 78 for increased rigidity and it is bent inwardly at ninety degrees from the section 77 to form the rail. The sides 69 and 70 of the tote box are bent to form an inwardly extending slot or track extending the length of the sides just below that edge of the sides 69 and 70 adjacent the open side of the tote container. The shape of this bend is best illustrated in FIG. 5 where the rail 78 is shown disposed in the track 80 formed in side wall 70 of the tote container. The deflection panels 72 and 73 are located so that the rails formed at their inner edges span the distance from one of the openings in the barrel wall 29 to the other opening. In FIG. 3, where the barrel is oriented so that the passageway through the barrel in which the tote boxes are inserted is perpendicular to the page, the rails formed at the end of the deflection panels 72 and 73 are disposed one in each of the corners of that passageway closest to the axis of the drum. Stated another way, the rails formed at the end of the two panels are positioned so that they fit within the tracks formed in the side walls of the tote box when the tote box is positioned in that passageway with its ends flush with the side wall 29 of the drum. A similar track 81 is formed in the surface of side wall 69. The lower ends of the side walls 69 and 70 are bent inwardly so that the tray has reduced width at its bottom to permit stacking of trays.

The processing material is expelled from the drum through its screened end walls 38 and 40. Means are provided in the invention for collecting that processing material after expulsion from the drum and for returning it to the point from which it is reintroduced into the drum. Advantageously, as shown, that means comprises a collector and funnel assembly consisting of the funnel 62 which is disposed beneath the drum, and two collector pans disposed one on each side of the drum. The drum and collector pan assembly completely encases the drum ends except at their hubs. The funnel is a four-sided structure the four side walls of which are designated 82, 83, 84 and 85, respectively, and are joined by their edges to adjacent walls. At their lower ends, the four sides are vertical and together define a chute 81 which is the exit of the funnel by which the process material is delivered to the cabinet 60. Above the chute 81 the four sides slope upwardly and outwardly to form the funnel proper. At their upper ends, the four sides are again arranged vertically. This vertical portion of each of sides 84 and 85 terminates with its upper edge parallel and just below the cylindrical surface 29 of the drum. The other two sides 82 and 83 extend vertically upward to a point just below the hub assemblies at the respective sides of the drum. The two collector pans are circular and have a circular portion at their center cut away to accommodate the hub structures of the drum. The pan at the left in FIG. 3 is designated by the numeral 88. It is flat except at its outer and inner margins where a peripheral portion 89 at the outer margin and a peripheral portion 90 at the inner margin are turned laterally inward toward the drum 28. The very edge portion at both the outer and inner periphery are turned back into the vertical plane to form a flange designated 91 in the case of the outer edge and 92 in the case of the inner edge. The other pan 93 is correspondingly shaped. It is disposed vertically except at its upper end where a peripheral portion 94 is turned inwardly toward the drum 28 at a diameter equal to the diameter of the wall 29 of the drum. The outer peripheral edge 95 of the pan is turned outwardly into the vertical plane to form a flange which insert holds the pan. At the center hub structure the flange is designated by the numeral 96 and the lateral portion is designated 97. The result is a pan structure which is spaced from the drum to provide an air passage externally of the drum but in which the edge at the inner opening and the edge at the outer periphery are formed as flanges disposed adjacent the rotating drum. All four of these flanges, two on each pan, are covered with a carpeting material which brushes against the rotating tumbler drum to form a seal against the passage of processing material and dust between the pan and the drum. The construction is shown in detail in FIG. 4 which shows the flange 93 having an outer peripheral portion 94 terminating in the outer peripheral edge portion 95 which serves as the flange of the pan. A layer 98 of carpeting material is secured by any convenient means, as by an adhesive, to the inner surface of the flange 95 whereby it brushes against the ring 41 to which the end wall 40 is attached.

While the shape is not visible in any figure of the drawing, a rectangular section, opening at its outer edge, is cut away from the lower portion of each collector pan. The upper vertical section of the two side walls 82 and 83 are rectangular in and of size to cover the cut away portion of the collector pans. The edges of this rectangular portion of side walls 82 and 83 are bent inwardly, as shown at 100 and 101 in FIG. 3, and are joined to the collector pans. Thus arranged, the collector pan and funnel assembly comprises a unitary structure completely encircling the drum ends but leaving all but the very bottom portion (that portion between walls 84 and 85 of FIG. 2) of the drum side 92 exposed.

Means are provided for rotating the drum. Advantageously, this means comprises a friction wheel 102 driven by a motor, not shown, which is carried by the enclosure of the machine 10. The friction wheel rotates the drum at preselected speed when the motor is energized.

Process material is delivered to the drum by hose or line 63 from the storage cabinent 60 and it is returned to that cabinent, together with dust if any, by the collector pan and funnel assembly. Any suitable means is provided for separating the dust and the fines and for preparing the processing material up to the blast gun 46. These elements may have any suitable one of several standard and well-known forms so they are shown only schematically in the drawing. The functions: separate fines from dust, store processing materal, and deliver processing material to the conductor 63 for delivery to the blast gun, are all performed in cabinet 60. Dust is withdrawn from the cabinet into a dust chamber 105 above a dust bin 106, by an exhaust blower 107. A filter 108 separates the blower from the dust chamber 105. The filter catches the dust as the dust laden air is drawn upwardly in the dust chamber 105 toward the blower 107. Ultimately dust collected by the filter falls and is deposited in the dust bin 106.

The means for withdrawing processing material, such as particulate abrasive matter, to the blast gun 46 may comprise a conduit or hose 109 which delivers compressed air to the nozzle 45 such that processing material is aspirated from the receptacle 60 through conduit 63.

The system described herein is suitable for conducting a variety of processes. Means are associated with the system for controlling the process steps and these means are illustrated schematically in FIG. 2. One of the control criteria is that drum rotation be prevented unless a tote tray is inserted in the drum in proper degree so that its ends are flush with the outer wall 29 of the drum. To sense that this condition exists, two detents are provided. These detents comprise spring mounted roller assemblies 111 and 112 located below the drum such that their rollers are biased against and rotatable with the drum. If the tote tray is missing or is not properly inserted, one or the other of these detents will interfere with drum rotation. A third spring loaded roller assembly 113 is mounted on section 14 of the conveyor. This detent structure senses the position of trays after being discharged from the drum to insure that the tray has been moved clear of the drum prior to drum rotation. All three of the detents 111, 112 and 113 are coupled with electric switches which interrupt drive motor operation in the event of improper tote tray sequencing by the tote tray advancing mechanism 18.

Two switch actuating structures are mounted on the exterior surface of the tumbling drum. One of these structures 115 cooperates with the switch 116 to detect rotation of the drum to the "tray-up" position. The other structure 117 cooperates with a switch 118 to signal "tray-down" position. It is essential that the drum be stopped in "tray-down" position as sensed by the switch 118 and its actuator 117 so that work pieces will be returned to the tray prior to removal of the tray. In some cases it may be desirable to stop the drum in the "tray-up" position shown in FIG. 2 prior to stopping in "tray-down" position while compressed air delivered by line 109 is forced into the drum of nozzle 45 to clear the drum of processing material and dust.

In operation of the device, material to be processed is placed in tote trays, such as tote trays 16 and 28 which are placed in sequence on the delivery section 12 of the conveyor. Means, whether automatic or manual, are provided for controlling the sequence of machine operations. The loading actuation ram mechanism 18 is retracted past the tote tray next to be inserted in the machine and then drives that tray into the machine pushing the tray that was in the machine to the discharge section 14 of the conveyor line. When the ram 18 has positioned the tote tray properly within the drum as sensed by detent structures 111 and 112 and when the previous tray has been satisfactorily removed to the conveyor section 14 as sensed by the detent structure 113, then the drive motor is energized to rotate the friction drive wheel 102 which rotates the tumbling drum. As the drum approaches its uppermost position the parts to be processed contained in the tote box are spilled out into the interior of the tumbling drum. When the drum rotates so that the tote tray is again positioned at the bottom of the drum, the parts are returned to the tray being directed thereto by the deflector panels 72 and 73. As rotation of the drum continues the tote tray again nears the uppermost point in its path and the parts are again spilled or tumbled into the interior of the drum. While the drum rotates and the work pieces are being spilled again and again from the tote box into the remainder of the drum, processing material, such as abrasive material, is aspirated through or forced through the delivery line 63 from the cabinet 60 and it is propelled from the blast gun by the nozzle 45 into the tumbling barrel in a direction generally toward the sides of the barrel and into contact with the work pieces which are spilled from the tote box into the interior of the drum. After a predetermined time, or after a predetermined number of revolutions of the drum, the control section 120, visible in FIG. 1, interrupts the flow of processing material from the gun 46 and stops rotation of the drum with the tray in uppermost position. The flow of compressed air through line 109 and nozzle 45 continues. During the tumbling operation particulate processing matter and dust is forced from the drum through its screened ends into the collector pan and funnel assembly from whence it is returned to the cabinet 60. When the drum rotation ceases compressed air flow continues for a time to clear the drum of dust which leaves the drum by the screened ends 38 and 40, passes by the collector pan and funnel assembly to the cabinet 60 and finally to the dust chamber 105. After a predetermined time the drum is rotated so that the tray occupies the lowermost position and the machine has completed one cycle and is ready for delivery of the next batch of material by the ram 18.

In the case of other processes, such for example as degreasing, it is sometimes desirable to limit drum rotation to an oscillatory motion short of complete rotation. In such cases the pieces to be treated may not tumble through the region of the axis of rotation so the processing material inlet structure is arranged to direct the processing material in other directions toward the parts.

Although I have shown and described certain specific embodiments of my invention, I am fully aware that many modifications thereof are possible.

I claim:
1. In combination:
a rotatable first container comprising a detachable portion itself defining a smaller, second container open to the interior of said first container;
means for rotating said first container such that work material to be processed which is contained in said second container is spilled into the interior of said first container;
means for passing processing material through said first container such that work material spilled into said first container is contacted thereby;
means for returning work material to said second container upon cessation of rotation of said first container; and
in which said first container comprises a drum rotatable upon an axis extending through end walls of the drum and further comprising a side wall encompassing said axis and interconnecting said end walls, a pair of openings formed in said wall defining a passageway through said drum lying in a plane perpendicular to said axis and at one side thereof; said second container having dimensions to pass through the passageway defined by said openings.

2. In combination:
a rotatable first container comprising a detachable portion itself defining a smaller, second container open to the interior of said first container;
means for rotating said first container such that work material to be processed which is contained in said second container is spilled into the interior of said first container;
means for passing processing material through said first container such that work material spilled into said first container is contacted thereby;
means for returning work material to said second container upon cessation of rotation of said first container; and
another container like said second container and means effective upon cessation of rotation of said first container for displacing said second container with said other container.

3. The invention defined in claim 1, in which said means for returning work material to said second container upon cessation of rotation of said first container comprises conformations on the interior surface of said drum for directing work material to the interior of said second container when the container occupies a position below said axis.

4. In combination:
a rotatable first container comprising a detachable portion itself defining a smaller, second container open to the interior of said first container;
means for rotating said first container such that work material to be processed which is contained in said second container is spilled into the interior of said first container;
means for passing processing material through said first container such that work material spilled into said first container is contacted thereby;

means for returning work material to said second container upon cessation of rotation of said first container; and in which said first container is cylindrical about a horizontal axis, the end walls of said cylinder being provided with a plurality of openings by which particulate matter may be expelled from said cylinder; and which further comprises means for directing a stream of particulate matter into the interior of said cylinder substantially along its axis of rotation, the cylindrical side wall of said cylinder being formed with parts of its surface cut away to form complementary openings defining a passageway extending perpendicular to and at one side of said axis; said second container comprising an open top, and end walls having the shape and occupying the position of the cut away portions of said cylinder when said second container is assembled with said first container; means comprising an interior wall of said first container for enclosing the space between the margins of the open top of said second container and the end walls of said cylindrical first container; means comprising a housing surrounding portions of said first container for collecting particulate matter expelled from said cylindrical container; said means for directing a stream of particulate matter into the interior of said cylindrical first container being effective to recirculate the particulate matter so direced.

5. The invention defined in claim 4, which further comprises means responsive to a signal for stopping rotation of said first container such that said second container occupies a horizontal position below the axis of rotation of said first container; a third container like said second container; and means operative when said first container has stopped rotating for pushing said third container into the position occupied by said second container thereby to dispel said second container from said first container together with any work material contained in said second container when assembled in said first container.

6. The invention defined in claim 5, in which said means for stopping rotation of said first container in a position in which said second container is horizontal comprises a detent apparatus for sensing rotational orientation of said first container; and which further comprises means for preventing rotation of said first container except when said second container occupies a position such that its end walls are flush with the cylindrical wall of said first container.

7. A work piece processing machine comprising a rotatable drum a portion of whose inner wall is detachable and is shaped to accommodate parts to be processed and means for assembling said detachable portion of said drum with the remainder of said drum while said detachable portion contains parts to be processed; said drum being rotatable about an axis and said means for assembling said detachable portion comprising means responsive to movement of said detachable portion relative to the drum in a direction transverse to the direction of said axis to complete their assembly.

8. The invention defined in claim 7 which further comprises means for rotating said container about said axis and means for stopping rotation of said container with said detachable portion disposed below said axis.

References Cited

UNITED STATES PATENTS

| | | | |
|---|---|---|---|
| 3,097,451 | 7/1963 | Freeman et al. | 51—13 |
| 3,132,449 | 5/1964 | Williams | 51—13 |
| 3,134,203 | 5/1964 | Roberts | 51—164 |

OTHELL M. SIMPSON, Primary Examiner

U.S. Cl. X.R.

51—164